United States Patent
Ohtsuka

Patent Number: 5,847,870
Date of Patent: Dec. 8, 1998

[54] BINOCULAR STEREO IMAGE DISPLAY METHOD

[75] Inventor: Sakuichi Ohtsuka, Kyoto, Japan

[73] Assignee: ATR Human Information Processing Research Laboratories, Kyoyo, Japan

[21] Appl. No.: 924,642

[22] Filed: Sep. 5, 1997

Related U.S. Application Data

[63] Continuation of Ser. No. 605,929, Feb. 23, 1996, abandoned.

[30] Foreign Application Priority Data

Feb. 27, 1995 [JP] Japan ................................ 7-038267

[51] Int. Cl.$^6$ ............................................. G02B 27/22
[52] U.S. Cl. ......................................................... 359/462
[58] Field of Search ................................ 359/462–465, 359/478; 348/57–60

[56] References Cited

U.S. PATENT DOCUMENTS

| | | | |
|---|---|---|---|
| 3,582,961 | 6/1971 | Shindo | 359/463 |
| 4,049,339 | 9/1977 | Ledan | 359/478 |
| 5,691,843 | 11/1997 | O'Neill | 359/462 |

FOREIGN PATENT DOCUMENTS

| | | | |
|---|---|---|---|
| 3421513 C1 | 1/1986 | Germany | 359/465 |
| 5-316541 | 11/1993 | Japan . | |
| 8-65715 | 3/1996 | Japan . | |

OTHER PUBLICATIONS

S. Ohtsuka, "Virtual Window: a Technique for Correcting Depth–Perception Distortion in Stereoscopic Displays," Society for Information Display International Symposium Digest of Technical Papers, vol. 27, May 1996.

Primary Examiner—Jon W. Henry
Attorney, Agent, or Firm—McDermott, Will & Emery

[57] ABSTRACT

When right and left images are presented on a projection plane which is a display plane with binocular disparity, an object located in front of projection plane $P_s$ can be perceived at the right position by accurately calculating the corresponding points while avoiding vignetting due to the picture frame of projection plane $P_s$ or by making it appear as if an occluding object at the frontmost plane (i.e. virtual frame VF) were present.

3 Claims, 4 Drawing Sheets

BINOCULAR STEREO IMAGE DISPLAY METHOD

This application is a continuation of application Ser. No. 08/605,929 filed Feb. 23, 1996 now abandoned.

BACKGROUND OF THE INVENTION

1. Field of the Invention

The present invention relates to binocular stereoscopic image display methods. More particularly, the present invention relates to a binocular stereoscopic image display method for displaying a stereoscopic image by projecting a plurality of actual images taken by a camera or the like or a plurality of images formed by computer graphics onto a lenticular lens or a polarization screen.

2. Description of the Related Art

FIG. 6 shows a conventional binocular stereoscopic image display device employing a polarization screen, and FIG. 7 shows a binocular stereoscopic image display device employing a lenticular lens.

Referring to FIG. 6, CRT displays 1 and 2 are provided so that their display planes provided with polarizers 3 and 4 are orthogonal to each other at right angles. In addition, a half mirror 5 for allowing the image displayed on CRT display 1 to pass therethrough and reflecting the image displayed on CRT display 2 is provided to form an angle of 45° with the display planes of CRT displays 1 and 2. A viewer 7 wears viewing glasses 6 with polarizers and looks at a pair of images with binocular disparity displayed on CRT displays 1 and 2 through viewing glasses 6 to observe a stereoscopic display.

Meanwhile, in the example shown in FIG. 7, a lenticular lens 9 is provided at a front surface of a liquid crystal display 8 and a pair of images with binocular disparity is displayed on liquid crystal display 8. Viewer 7 observes a stereoscopic display by viewing the images with binocular disparity displayed on liquid crystal display 8 through lenticular lens 9.

FIG. 8 is a view for describing viewpoints for a stereoscopic image. In order to obtain depth perception from stereopsis, a pair of images taken with the positions R and L of the right and left eyes as viewpoints or computer graphic images projected on projection plane $P_s$ are utilized as presented images, as shown in FIG. 8. The ranges of the right and left images presented on projection plane $P_s$ are generally equal to each other. In accordance with the conventional methods shown in FIGS. 6 and 7, depth perception can be accurately reproduced for objects $O_{21}$ and $O_{22}$ which are located behind projection plane $P_s$. In other words, the region where a stereoscopic image can be accurately reproduced is contained within the frame indicated by the thick lines surrounding plane $P_1$ in FIG. 8. However, a human being can usually estimate the accurate depth of an image which is behind an occluding object from its positional relationship with the surrounding region even though the image includes a portion viewable only by a single eye. Therefore, object $O_{22}$ can also be perceived with the accurate depth in this case.

Regarding objects $O_{11}$, an $O_{12}$ which are placed in front of projection plane $P_s$, however, accurate depth thereof cannot be necessarily perceived. More specifically, when a portion of an object is projected only to one eye and occluded by the picture frame on the projection plane to the other eye as is the case of object $O_{12}$, the object is not perceived at plane $P_1$ that is supposed to be perceived but perceived as if it were present at the same plane as projection plane $P_s$ or at a slanted plane extending over plane $P_1$ and projection plane $P_s$. As a result, a significant distortion in depth perception is undesirably generated at a scene including an object located in front of the projection plane.

SUMMARY OF THE INVENTION

An object of the present invention is to provide a binocular stereoscopic image display method capable of removing distortion in depth perception from stereopsis as described above and accurately reproducing depth perception of an object located in front of a projection plane.

Briefly stated, the present invention relates to a binocular stereoscopic image display method for presenting right and left images on a projection plane which is a display plane with binocular disparity. In accordance with this method, when image signals for displaying right and left images are to be produced, in the space closer to a viewer than the projection plane only the space produced by a logical product of the right and left visual field spaces produced by right and left viewpoints and the projection plane is utilized as right and left image production region, while in the space farther than the projection plane the visual field spaces produced within respective solid angles formed by right and left viewpoints and the projection plane are utilized as respective right and left image production regions, thereby removing distortion in depth perception.

Therefore, in accordance with the present invention, an object can be perceived with the correct positional relationships and a conventional problem of distortion in depth perception can be solved.

In a preferred embodiment of the present invention, binocular disparity of each object is calculated from a stereoscopic image formed by projecting right and left images so as to reconstruct the above-mentioned visual field spaces.

According to another aspect of the present invention, the present invention relates to a binocular stereoscopic image display method for presenting right and left images on a projection plane which is a display plane with binocular disparity. In accordance with this method, when right and left images are to be projected and displayed, and the regions of the right and left images are not matched on the projection plane, an image for the right eye on the projection plane is obtained on the pojection plane by relatively enlarging the left display region and an image for the left eye is obtained by relatively enlarging the right display region to eliminate or reduce distortion in depth perception.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 7A is an enlarged view of a portion of FIG. 7.

DESCRIPTION OF THE PREFERRED EMBODIMENTS

Figure 1:
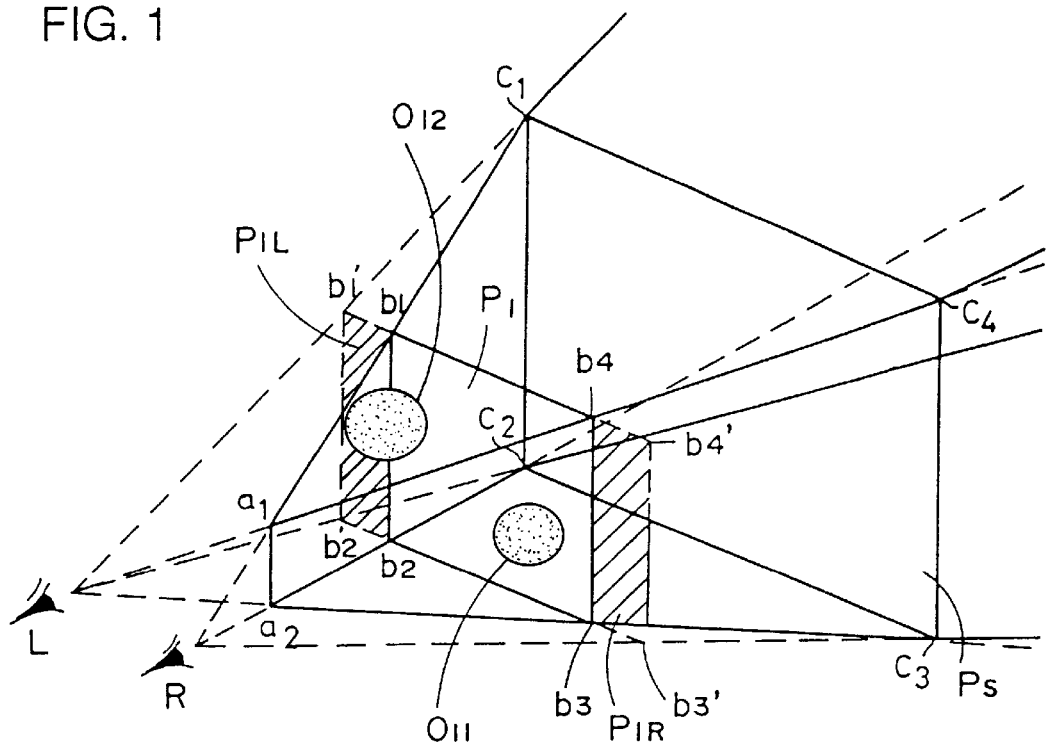
FIG. 1 is a view for describing the principle of the present invention.
Figure 2A:
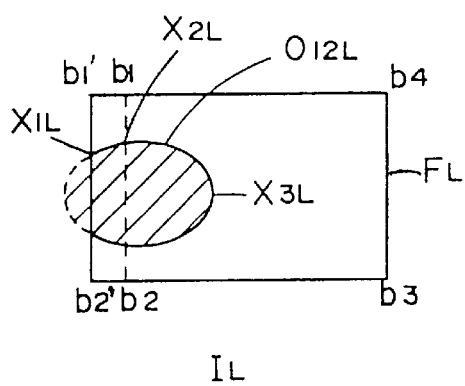
FIGS. 2A and 2B show examples where the object illustrated in FIG. 1 is developed to the right and left projected images.
Figure 2B:
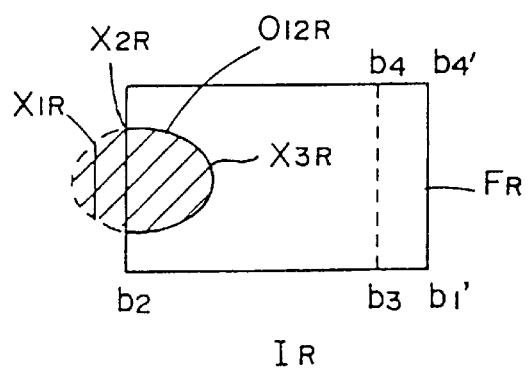
Figure 3:
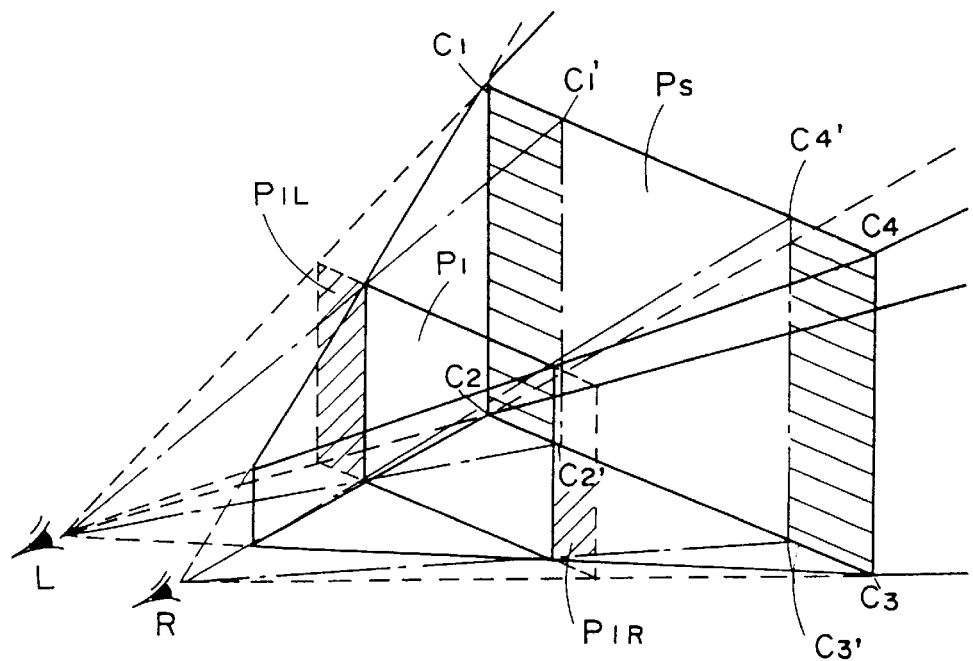
FIG. 3 shows the principle of a method for removing a taken image.

FIG. 1 is a view for describing the principle of the present invention, FIGS. 2A and 2B show examples where the object illustrated in FIG. 1 is developed to the right and left projected images, and FIG. 3 shows the principle of a method of removing a taken image. Referring to FIGS. 2A and 2B, right and left picture frames $F_R$ and $F_L$ are fused and perceived on projection plane $P_s$ by a human observer. Meanwhile, for the right side of object $O_{12}$, i.e. in area $x_{3R}-x_{2R}$ both right and left images are presented to the observer; however, in area $x_{2R}-x_{1R}$ only the left eye image is presented. The present applicants have found through an experiment that, if the left eye image is cut at vertical line $x_{1L}$ and the right eye image is cut at vertical line $x_{2R}$, a human observer perceives respective left end lines $x_{2R}$ and $x_{1L}$ of the right and left images as the corresponding lines whether frame F is present or not, although they are not the actual corresponding lines. As a result, object $O_{12}$ is perceived as having the left side present on the plane without binocular disparity(on projection plane $P_s$) and the right side on front plane $P_1$, slanted as a whole. In order to prevent such miscorrespondence, area $X_{1L}-X_{2L}$ of left eye image $I_L$ must be eliminated. By thus eliminating an unnecessary portion from display, only the images in area $x_{3R}-x_{2R}$ of object $O_{12}$ are presented corresponding to the right and left eyes, and object $O_{12}$ is perceived accurately on front plane $P_1$. The methods of thus displaying only the corresponding lines of an object on plane $P_1$ in front of projection plane $P_s$ are roughly divided into two groups.

A first method can be utilized when computer graphics are used and the position of an object is clear are used or when all corresponding points in right and left images taken by a stereoscopic camera can be calculated from a certain method. In FIG. 1, the image of an object is displayed if it is contained in the wedge-shaped space defined by $a_1$, $a_2$, $c_1$, $c_2$, $c_3$ and $c_4$, and the rest of the portion is eliminated. More specifically, in the space closer to a viewer than projection plane $P_s$, only the space produced by a logical product of right and left visual field spaces formed by respective right and left viewpoints R and L and projection plane $P_s$ is utilized as the right and left image production region. If the object is behind projection plane $P_s$, all the portions projected to projection plane $P_s$ must be displayed (usual occluding condition). Thus, an unnecessary portion can be eliminated corresponding to the depth of an object, and an object placed in front of projection plane $P_s$ can be accurately located.

A second method can be utilized when the position of an object with respect to its depth is not clear. Designating the most proximate plane as $P_1$ in FIG. 3, monocular regions $P_{1R}$ and $P_{1L}$ adjacent thereto of the taken image are replaced by an occluding object such as a virtually produced picture frame (virtual frame VF) and displayed on projection plane $P_s$ so that the viewer perceives the occluding object as if it existed at monocular regions $P_{1R}$ and $P_{1L}$. The monocular regions correspond to the regions defined by $c_1$, $c_2$, $c_2'$ and $c_1'$ (only the left eye portion is shown; the right eye portion is adjacent to projection plane $P_s$ on the left) and the region defined by $c_4'$, $c_3'$, $c_3$ and $c_4$ (only the right eye portion is shown; the left eye portion is adjacent to projection plane $P_s$ on the right). Therefore, regarding the taken image, the image for the right eye is obtained by relatively enlarging the left display region and the image for the left eye is obtained by relatively enlarging the right eye display region. Thus, the state similar to the usual half-occlusion can be obtained geometrically.

As described above, a human observer can perceive an object with the correct positional relationship by (1) accurately calculating the corresponding points to avoid vignetting by the picture frame or (2) making it appear as if there were an occluding object at the frontmost plane, thereby solving the conventional problem of distortion in depth perception.

Now, description will be made of the effects produced when perfect correction is not made by the method (2). If the object is in front of the assumed frontmost plane, the picture frame of the assumed frontmost plane functions similarly to the picture frame of the actual projection plane in the conventional method. In this case as well, an amount of distortion in depth perception is decreased since the projection plane is more proximate than in the conventional method. Next, description will be made of the effects of the approach where the picture frame is not displayed at monocular regions (defined by $c_1$, $c_2$, $c_2'$ and $c_1'$, and $c_4'$, $c_3'$, $c_3$, and $c_4$) but simply the image is eliminated. Although an object on the frontmost plane $P_1$ is perceived at the right position, for an object located behind the frontmost plane $P_1$ the portion to be eliminated is eliminated more than necessary and conversely the portion in contact with the picture frame may be perceived as protruded forward to the frontmost plane $P_1$. Though such partial elimination of an image alone gives adverse effects, setting the assumed frontmost plane $P_1$ at an intermediate position of the real frontmost plane and the actual projection plane makes it possible to set distortion at an intermediate value with respect to the depthwise direction, so that the corresponding effects of reducing distortion can be expected with this approach as well.

Figure 4A:
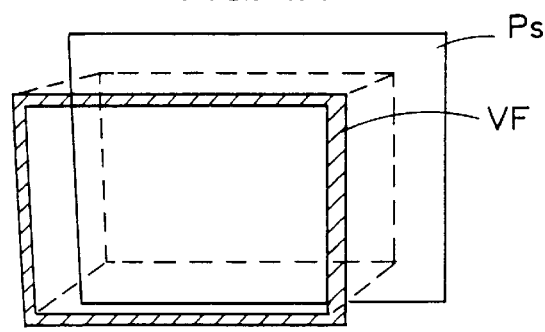
FIGS. 4A and 4B show one embodiment of the present invention.
Figure 4B:
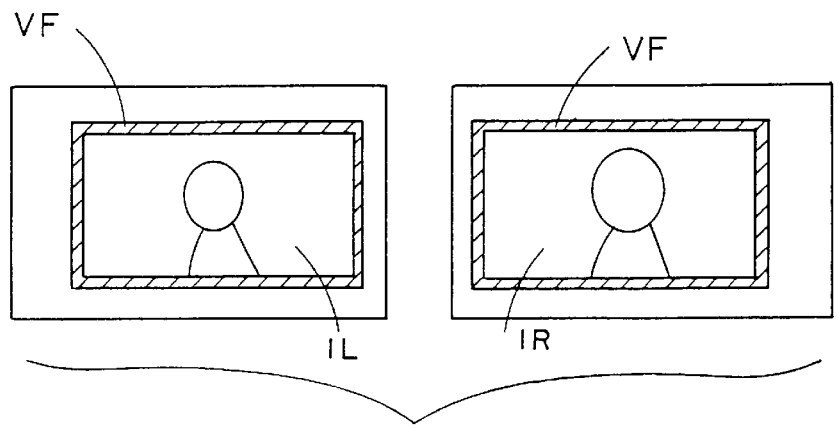

FIGS. 4A and 4B show one embodiment of the present invention. Referring to FIGS. 4A and 4B, description will be made of an embodiment in which an occluding object is made to appear as if it were present on the frontmost plane of the taken image. In FIGS. 4A and 4B, projection plane $P_s$ is made slightly larger to avoid a sudden change in binocular disparity between the projected objects inside the display screen and real objects outside the display screen. By employing right and left images $I_R$ and $I_L$ shown in FIG. 4B, a state where virtual frame VF perceptionally emerges in the space in front of actual projection plane $P_s$ is realized as shown in the bird's-eye view of FIG. 4A. The width (more strictly, the angle) of virtual frame VF must be as great as or greater than length $c_1-c_1'$ (or $c_4'-c_4$) in FIG. 3 in order to create the correct occluding conditions geometrically. However, a smaller width of virtual frame VF is acceptable in actual use (decrease in width causes the object to retreat gradually).

Thus, by displaying virtual frame VF, all the objects located behind virtual frame VF can be perceived with the correct depth even though they are placed in front of actual projection plane $P_s$.

Figure 5:
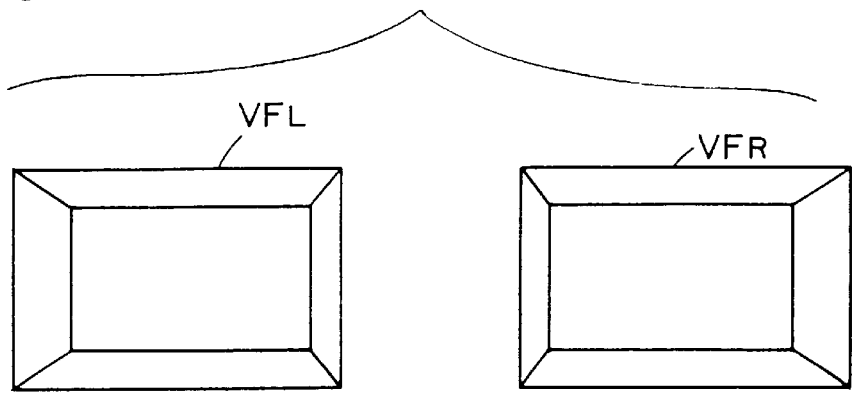
FIG. 5 shows another embodiment of the present invention.
Figure 6:
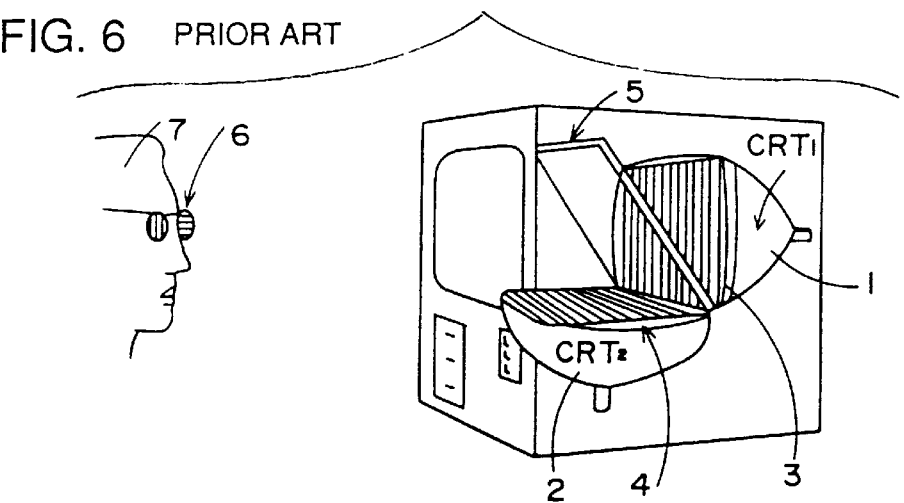
FIG. 6 shows a conventional binocular stereoscopic image display device employing a polarization screen.
Figure 7:
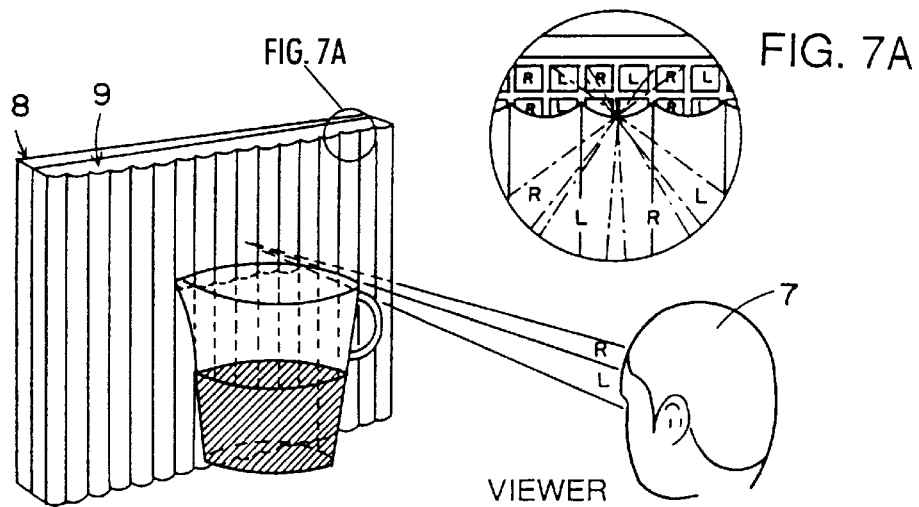
FIG. 7 shows a conventional binocular stereoscopic image display device employing a lenticular lens.
Figure 8:
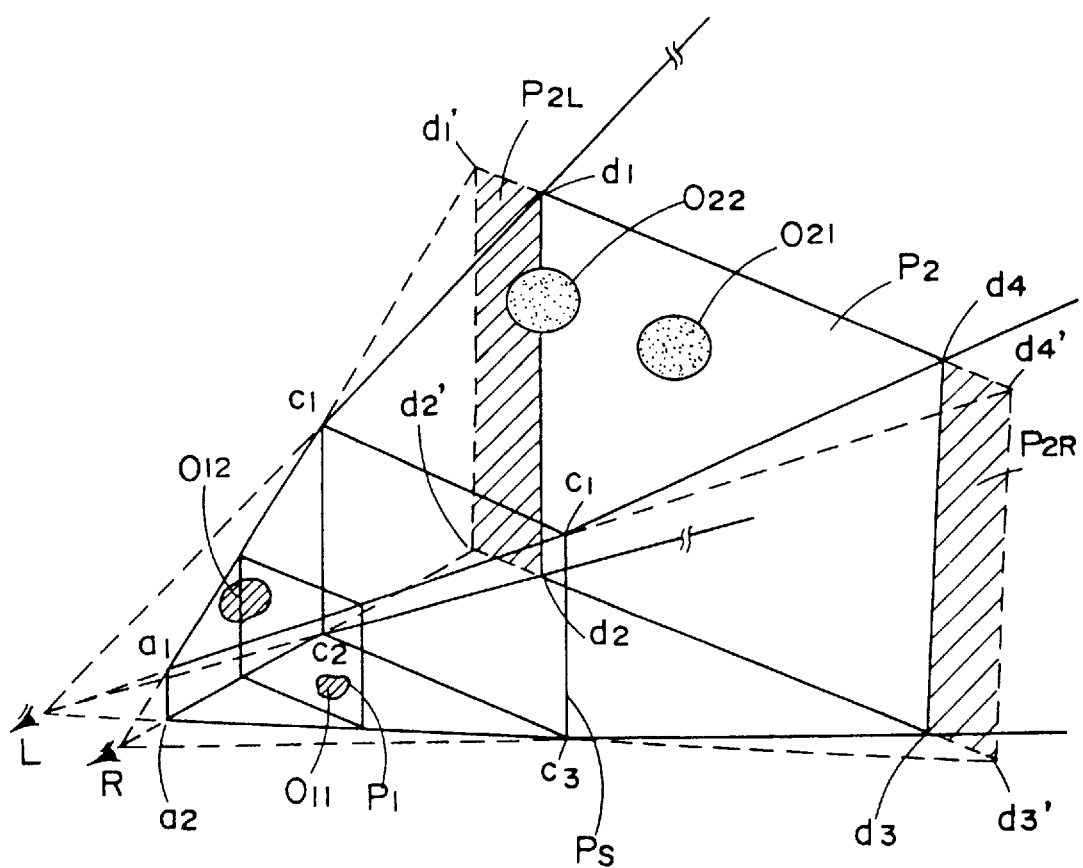
FIG. 8 is a view for describing the viewpoints for a stereoscopic image.

FIG. 5 shows another embodiment of the present invention. In accordance with the embodiment shown in FIG. 5, the left end of the left virtual frame $VF_L$ and the right end of the right virtual frame $VF_R$ are formed to appear not only as frames but also as covers. The virtual frames are not limited to those shown in FIG. 5 and modifications thereof can be made.

Since elimination of the region in a computer graphic image is achieved by implementating the method for determining the region through calculation, description of the embodiment thereof is not made here.

As described above, according to the embodiments of the present invention, an object located in front the projection plane can be perceived at the correct position and distortion in depth perception can be eliminated by calculating the corresponding points accurately to avoid vignetting due to the picture frame of the projection plane, or by making it appear as if an occluding object at the frontmost plane, i.e. the virtual frame, were present. Since an image can be projected to a virtual stereoscopic screen at an appropriate distance while maintaining a great physical distance between the actual projection plane and the observer through application of the present invention, the invention is particularly advantageous in installing a stereoscopicscopic television on the wall in a spacious room. In implementing the present invention, the position of the virtual frame can be varied by the observer, or can be set automatically at a predetermined position in accordance with the presented image or set adaptively by calculating the content of the image. In addition, display/non-display of the frame (virtual frame) can be automatically switched in accordance with computer graphics/actual images, or the color, pattern, and the like of the frame can be changed.

While the description above is all based on the principle of binocular stereoscopic image display method, the basic principle is the same in the multichannel lenticular screen system. Therefore, exactly the same effects can be obtained by application of the present invention also in the multichannel lenticular screen system.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A method for displaying a binocular stereoscopic image on a projection plane which is a display plane having binocular disparity, wherein image signals for displaying right and left images are to be produced without experiencing depth perception distortion, which method comprises utilizing in the space closer to the viewer than the projection plane only the space produced by a logical product of the right and left visual field spaces produced by right and left viewpoints of the viewer and the projection plane as right and left image production regions, while in the space farther than the projection plane the visual field spaces produced within respective solid angles formed by said right and left viewpoints and the projection plane are utilized as respective right and left image production regions, thereby removing distortion in depth perception.

2. A method according to claim 1, wherein binocular disparity of each object is calculated, based upon the size of the projection plane and the distance between the viewer and a screen, using corresponding points of an artificially generated stereoscopic image of each said object formed by projecting right and left images so as to reconstruct said visual field spaces.

3. A binocular stereoscopic image display method in which right and left images are presented on a projection plane which is a display plane with binocular disparity, wherein right and left image display regions are not matched on the projection plane, thereby producing a monocular region resulting in distortion in depth perception, comprising displaying a virtual frame by obtaining an image for the right eye on the projection plane by relatively enlarging the left display region and obtaining an image for the left eye by relatively enlarging the right display region, thereby reducing or eliminating distortion in depth perception.

* * * * *